US012608251B2

(12) United States Patent
Chen et al.

(10) Patent No.: US 12,608,251 B2
(45) Date of Patent: Apr. 21, 2026

(54) MICRO-FRONTEND SYSTEM, SUB-APPLICATION LOADING METHOD, ELECTRONIC DEVICE, COMPUTER PROGRAM PRODUCT, AND COMPUTER-READABLE STORAGE MEDIUM

(71) Applicant: TENCENT TECHNOLOGY (SHENZHEN) COMPANY LIMITED, Shenzhen (CN)

(72) Inventors: Siming Chen, Shenzhen (CN); Liangzhi Luo, Shenzhen (CN); Jiangsong Chen, Shenzhen (CN); Peng Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 708 days.

(21) Appl. No.: 17/962,218

(22) Filed: Oct. 7, 2022

(65) Prior Publication Data

US 2023/0036980 A1     Feb. 2, 2023

Related U.S. Application Data

(63) Continuation of application No. PCT/CN2021/137072, filed on Dec. 10, 2021.

(30) Foreign Application Priority Data

Dec. 21, 2020     (CN) .......................... 202011520184.6

(51) Int. Cl.
*G06F 9/54* (2006.01)
*G06F 16/955* (2019.01)

(52) U.S. Cl.
CPC .............. *G06F 9/547* (2013.01); *G06F 9/541* (2013.01); *G06F 16/9566* (2019.01)

(58) Field of Classification Search
None
See application file for complete search history.

(56) References Cited

U.S. PATENT DOCUMENTS

2016/0092339 A1     3/2016   Straub et al.
2016/0162320 A1*    6/2016   Singh .................. G06F 9/45533
                                                                      718/1

(Continued)

FOREIGN PATENT DOCUMENTS

CN          106598575  A      4/2017
CN          109542538  A      3/2019

(Continued)

OTHER PUBLICATIONS

Chen; English translation of CN 111538545 B; Jul. 12, 2024 (Year: 2024).*

(Continued)

*Primary Examiner* — Umut Onat
(74) *Attorney, Agent, or Firm* — Sughrue Mion, PLLC

(57) ABSTRACT

Embodiments of the disclosure provide a micro-frontend system, a sub-application loading method, an electronic device, a computer program product and a computer-readable storage medium. The micro-frontend system includes: a routing registration service, a command line tool and a micro-frontend running framework. The routing registration service is an independently maintained and run Node backend service, configured to provide routing information of a sub-application, a loading manner of the sub-application and deployment information of the sub-application for the micro-frontend running framework of a primary application; the command line tool is configured to provide a sub-application creation function, a sub-application access func- (Continued)

Micro-frontend system 100
- Routing registration service 101
- Command line tool 102

Micro-frontend running framework 103
- Basic function library module 1031
- Communication module 1032
- Unified routing module 1033
- Sub-application loading module 1034
- Sub-application running module 1035
- Data management module 1036
- Performance monitoring module 1037
- Error handling module 1038 tion and a service registration function through a command line; and the micro-frontend running framework is a framework running in the primary application and is configured to load and run, based on a network request, the sub-application and provide a multi-framework sub-application running ability.

19 Claims, 6 Drawing Sheets

(56)　　　　　References Cited

U.S. PATENT DOCUMENTS

| | | | | |
|---|---|---|---|---|
| 2021/0192106 A1 * | 6/2021 | Bourhani | ................. | G06F 8/35 |
| 2023/0013371 A1 * | 1/2023 | Liu | ....................... | H04L 65/402 |

FOREIGN PATENT DOCUMENTS

| | | | | | | |
|---|---|---|---|---|---|---|
| CN | 110377274 | A | | 10/2019 | | |
| CN | 110806895 | A | | 2/2020 | | |
| CN | 112114784 | A | * | 12/2020 | ............... | G06F 8/20 |
| CN | 111538545 | B | * | 7/2024 | ............... | G06F 8/41 |

OTHER PUBLICATIONS

Fang et al.; English translation of CN 112114784 A; Dec. 22, 2020 (Year: 2020).*

International Search Report for PCT/CN2021/137072 dated Feb. 25, 2022.

* cited by examiner

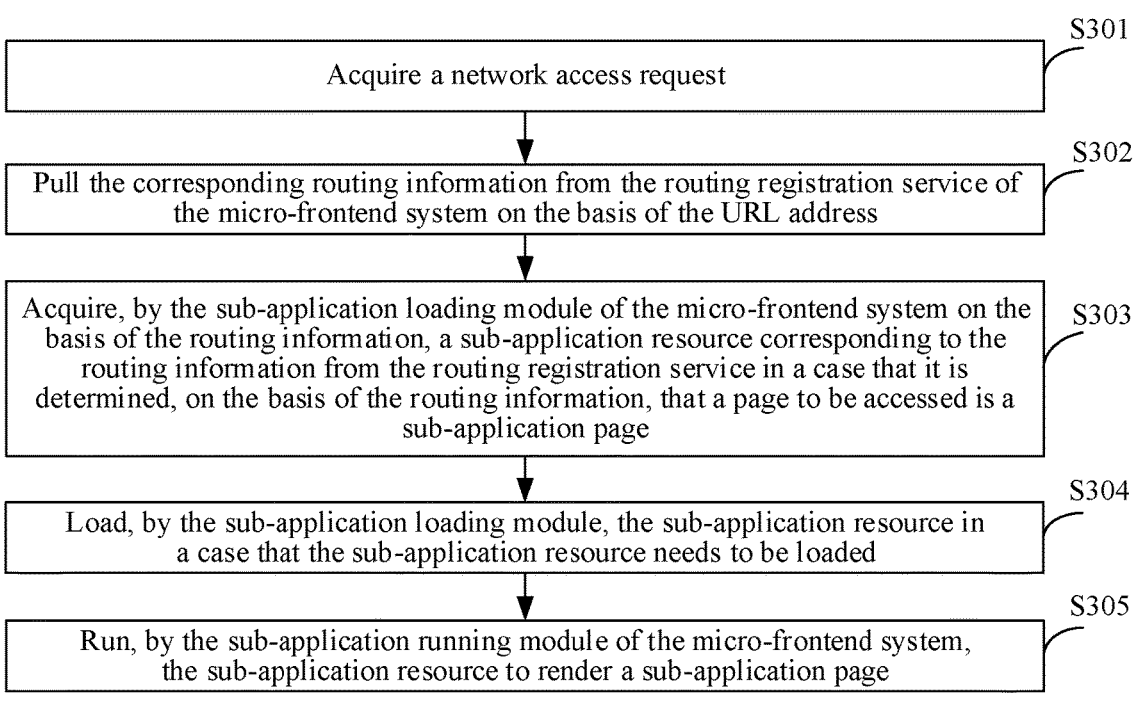

S301
Acquire a network access request

S302
Pull the corresponding routing information from the routing registration service of the micro-frontend system on the basis of the URL address S303
Acquire, by the sub-application loading module of the micro-frontend system on the basis of the routing information, a sub-application resource corresponding to the routing information from the routing registration service in a case that it is determined, on the basis of the routing information, that a page to be accessed is a sub-application page S304
Load, by the sub-application loading module, the sub-application resource in a case that the sub-application resource needs to be loaded S305
Run, by the sub-application running module of the micro-frontend system, the sub-application resource to render a sub-application page

FIG. 3

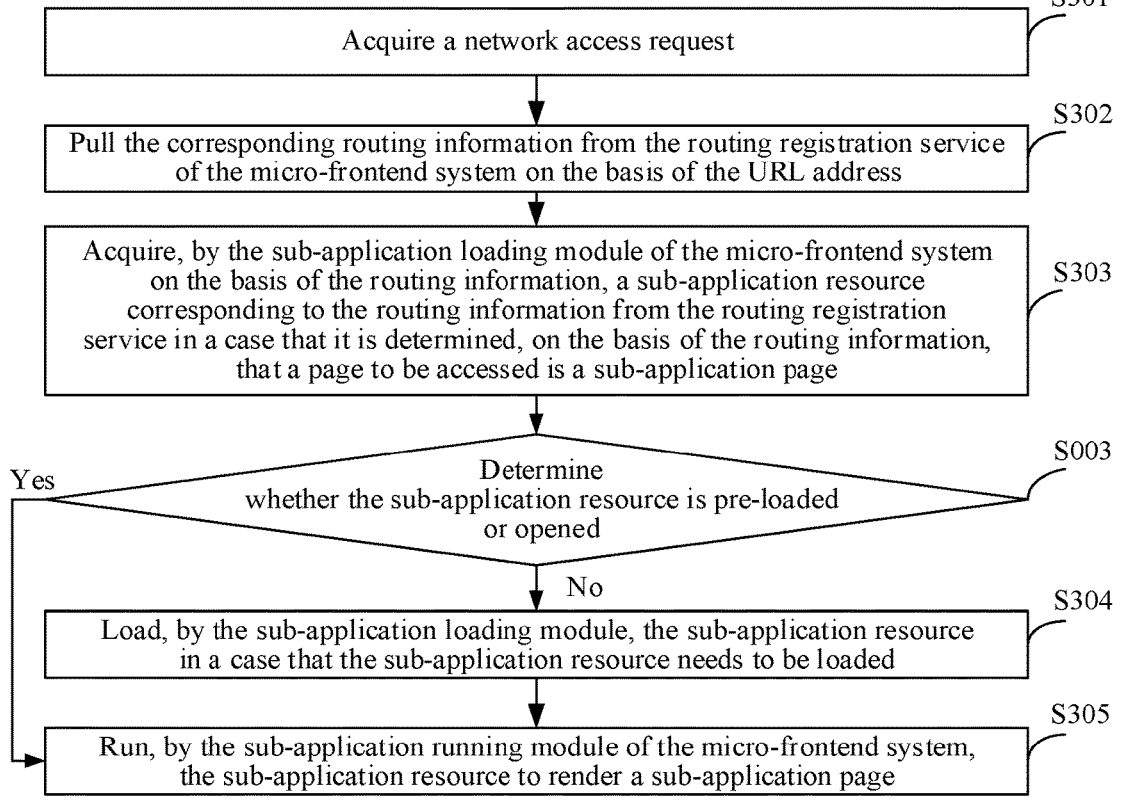

S301
Acquire a network access request

S302
Pull the corresponding routing information from the routing registration service of the micro-frontend system on the basis of the URL address S303
Acquire, by the sub-application loading module of the micro-frontend system on the basis of the routing information, a sub-application resource corresponding to the routing information from the routing registration service in a case that it is determined, on the basis of the routing information, that a page to be accessed is a sub-application page S003
Determine whether the sub-application resource is pre-loaded or opened Yes No S304
Load, by the sub-application loading module, the sub-application resource in a case that the sub-application resource needs to be loaded S305
Run, by the sub-application running module of the micro-frontend system, the sub-application resource to render a sub-application page

FIG. 4

Micro-frontend running framework 603

Basic public library/Polufills

| Authorization information | User information | Performance monitoring |
| General method | Communication mechanism | Error handling |

Unified routing

Routing registration service 601

↓ Application loading/preloading

CLI tool 602    Life cycle registration/ management    ↕ Communication

| CLI tool generation sub-application | CLI tool access sub-application | CLI tool registration sub-application |

Technical stack independence/CSS isolation/JS sandbox

Invoke a backend micro service

Backend service

| Backend service A | Backend service B |
| Backend service C | Third-party service |

FIG. 6

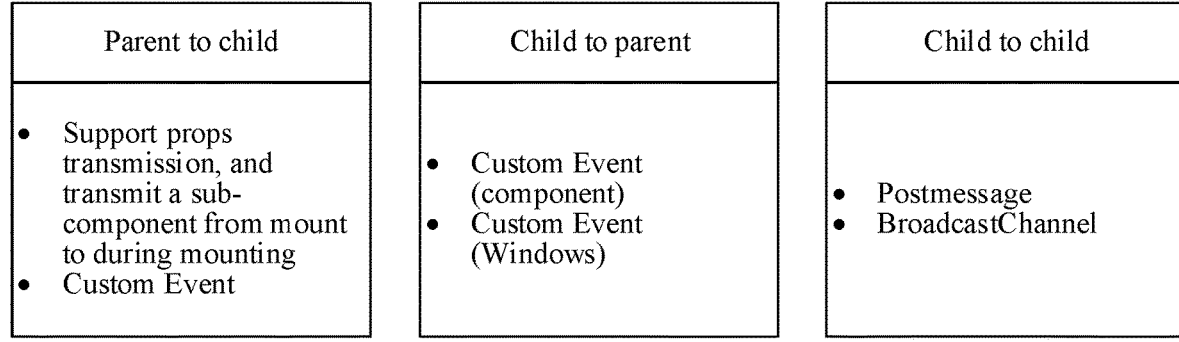

| Parent to child | Child to parent | Child to child |
|---|---|---|
| • Support props transmission, and transmit a sub-component from mount to during mounting<br>• Custom Event | • Custom Event (component)<br>• Custom Event (Windows) | • Postmessage<br>• BroadcastChannel |

FIG. 7

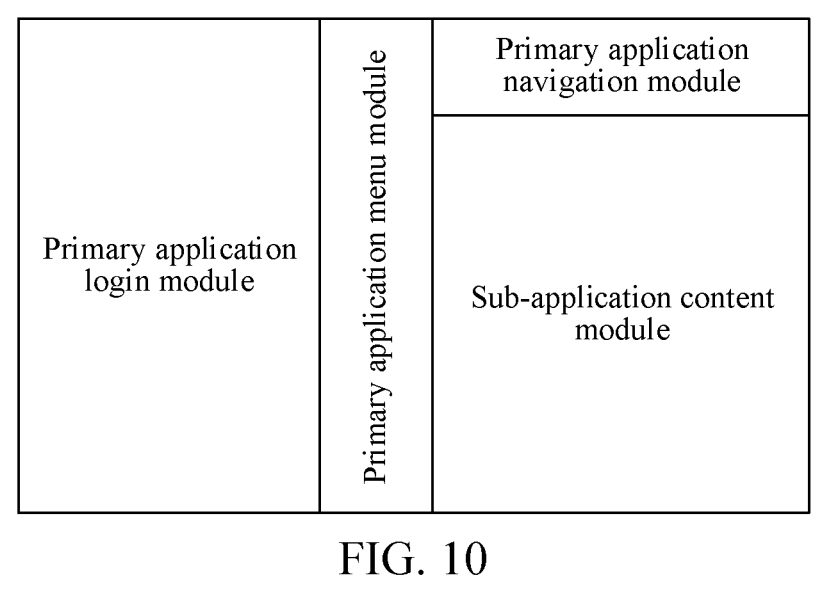

| Primary application login module | Primary application menu module | Primary application navigation module |
| | | Sub-application content module |

FIG. 10

MICRO-FRONTEND SYSTEM, SUB-APPLICATION LOADING METHOD, ELECTRONIC DEVICE, COMPUTER PROGRAM PRODUCT, AND COMPUTER-READABLE STORAGE MEDIUM

CROSS-REFERENCE TO RELATED APPLICATION(S)

This application is a bypass continuation of International Application No. PCT/CN2021/137072, filed Dec. 10, 2021, which claims priority to Chinese Patent Application No. 202011520184.6, filed on Dec. 21, 2020, the disclosures of which are incorporated herein by reference in their entireties.

FIELD

Embodiments of the disclosure relate to the technical field of Internet, and relates to, but not limited to, a micro-frontend system, a sub-application loading method, an electronic device, a computer program product and a computer-readable storage medium.

BACKGROUND

In a process of frontend development, development projects are getting bigger. Furthermore, product functions are complex, code conflicts frequently occur, and the impact is significant. In response to a series of problems, micro-frontends came into being. Referring to the concept of backend micro-services, for the micro-frontend, a large frontend project is split into small projects. These small projects are fully capable of being independently developed and run. The entire system achieves displaying and interaction of all pages by cooperation of these small projects.

A micro-frontend framework routing service of the related art technology is forwarded by a Nginx service, which is inefficient. Central routing depends on the stability of the Nginx service, so that the disaster recovery solution is complex. The Nginx service is highly dependent on Nginx service configurations. In case of modification of the configurations, the central routing Nginx service needs to be restarted, so that the maintenance cost is high.

SUMMARY

Embodiments of the disclosure provide a micro-frontend system, a sub-application loading method, an electronic device, a computer program product and a computer-readable storage medium. The expansion and disaster recovery capabilities may be improved by independently maintained and run node services, and the multi-framework sub-application running ability may be provided.

The Technical Solutions in the Embodiments of the Disclosure are Implemented as Follows:

An aspect of an example embodiment of the disclosure provides a micro-frontend system, including:

a routing registration service, a command line tool and a micro-frontend running framework, wherein the routing registration service is an independently maintained and run Node backend service, configured to provide routing information of a sub-application, a loading manner of the sub-application and deployment information of the sub-application for the micro-frontend running framework of a primary application;

the command line tool is configured to provide a sub-application creation function, a sub-application access function and a service registration function through a command line; and the micro-frontend running framework is a framework running in the primary application and is configured to load and run, based on a network request, the sub-application and provide a multi-framework sub-application running ability.

An aspect of an example embodiment of the disclosure provides a sub-application loading method, the method being executed by an electronic device and configured as a micro-frontend system, the micro-frontend system including: a routing registration service, a sub-application loading module and a sub-application running module; the method comprising:

acquiring a network access request configured to access a sub-application, the network access request carrying a uniform resource locator (URL) address of the sub-application;

pulling routing information corresponding to the sub-application from the routing registration service based on the URL address of the sub-application;

acquiring, by the sub-application loading module based on the routing information, a sub-application resource corresponding to the routing information from the routing registration service based on a determination that, based on the routing information, the page to be accessed is a page of a sub-application;

loading, by the sub-application loading module, the sub-application resource; and running, by the sub-application running module, the sub-application resource, and rendering the page of the sub-application.

An aspect of an example embodiment of the disclosure provides a computer-readable storage medium which stores executable instructions configured to, when being executed by a processor, implement the sub-application loading method based on the micro-frontend system.

An aspect of an example embodiment of the disclosure provides an electronic device, including a memory and a processor, the memory storing a computer program, and the processor being configured to perform the sub-application loading method based on the micro-frontend system by using the computer program.

An aspect of an example embodiment of the disclosure provides a computer program product, including a computer program, the computer program, when executed by a processor, implementing the sub-application loading method based on a micro-frontend system.

BRIEF DESCRIPTION OF THE DRAWINGS

FIG. 3 is a schematic diagram of an implementation process of a sub-application loading method based on a micro-frontend system provided according to an embodiment of the disclosure;

FIG. 4 is a schematic diagram of another implementation process of a sub-application loading method based on a micro-frontend system provided according to an embodiment of the disclosure;

FIG. 6 is a schematic diagram of architecture of a micro-frontend system provided according to an embodiment of the disclosure;

FIG. 7 is a schematic diagram of a communication mechanism in a micro-frontend system provided according to an embodiment of the disclosure;

FIG. 10 is a schematic diagram of application layering provided according to an embodiment of the disclosure.

DETAILED DESCRIPTION

Figure 1:
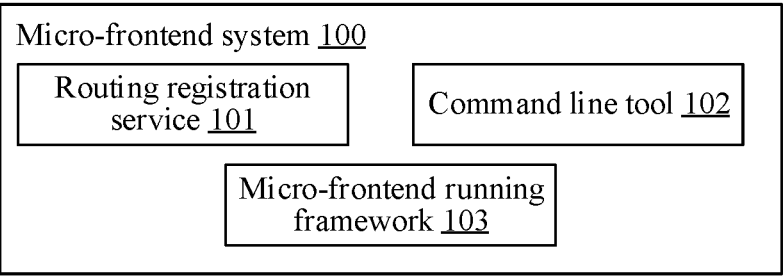
FIG. 1 is a schematic diagram of a composition structure of a micro-frontend system provided according to an embodiment of the disclosure.

To make the objectives, technical solutions, and advantages of the disclosure clearer, the following describes the disclosure in further detail with reference to the accompanying drawings. The described embodiments are not to be considered as a limitation to the disclosure. All other embodiments obtained by a person of ordinary skill in the art without creative efforts shall fall within the protection scope of the disclosure.

In the following descriptions, related "some embodiments" describe a subset of all possible embodiments. However, it may be understood that the "some embodiments" may be the same subset or different subsets of all the possible embodiments, and may be combined with each other without conflict.

Unless otherwise defined, meanings of all technical and scientific terms used in this embodiment are the same as those usually understood by a person skilled in the art to which this embodiment of the disclosure belongs. Terms used in this embodiment of the disclosure are merely intended to describe objectives of the embodiments of the disclosure, but are not intended to limit the disclosure.

Before the embodiments of the disclosure are further described in detail, a description is made on terms involved in the embodiments of the disclosure, and the terms involved in the embodiments of the disclosure are applicable to the following explanations.

1) Vue framework: It is a set of progressive frontend framework for building a user interface. A core library of Vue only concerns about a view layer.

2) React framework: It is configured to build JavaScript™ library of a user interface, and is mainly configured to build a user interface. React may transmit various types of parameters, such as a statement code, and render the user interface, or may be a static element, or may transmit dynamic variables, and even may be an interactive application component.

3) JavaScriptJavaScript™ sandbox mechanism: It is a security mechanism for providing an isolation environment for running programs. A JavaScript™ code is run by providing an execution environment isolated from the outside. The JavaScript JavaScript™ sandbox mechanism is often used in a micro-frontend to help decouple independent on-line non-interfering codes, so as to reduce the maintenance cost.

4) Web Worker: It is a JavaScript™ multi-thread solution provided by a HyperText Markup Language (HTML) 5. Some codes with large computational amounts may be run by Web Worker, without freezing a user interface. Web Worker is independent of other scripts, and will not affect the performance of a page.

5) Shadow document object model: It is a norm of a HyperText Markup Language, and allows interpolation of a document object model element subtree before document rendering. The shadow document object model allows browser developers to package their own HTML labels, cascading style sheets (CSS) and specific JavaScript™ codes, and the developers may also create customized first-level labels similar to <input>, <video>, and <audio>.

6) Props transmission: A template of a parent component contains a child component. The parent component needs to forwardly transmit data or parameters to the child component. The child component renders different contents or executes an operation according to different parameters after receiving the data or parameters. This process of forwardly transmitting data is achieved by Props.

7) Custom event transmission: The interaction between JavaScript™ and HTML is achieved through events. Events are some specific moments of interaction that occur in a document or browser window. Specific custom events may be triggered at any time through JavaScript™, and these events are the same as events created by a browser.

8) PostMessage: It is an application programming interface method introduced by HTML5, which supports scripts from different sources to communicate effectively with each other in an asynchronous manner. It may realize cross-text documents and multi-window and cross-domain message transmission. PostMessage is mostly configured to achieve data communication between windows, which also makes it an effective solution for cross-domain communications.

9) Iframe: It is a HyperText Markup Language label configured to create an inline framework (i.e. Iframe) that contains another document.

10) Node.js: It is a JavaScript™ runtime environment based on a Chrome V8 engine. An event-driven, non-blocking I/O model is used to allow JavaScript™ to run on a server-side development platform. JavaScript™ is made to be a scripting language equal to server-side languages such as PHP, Python™, Pearl™, and Ruby™.

11) Polyfilling: It indicates that a method exists in the JavaScript™ norm, but is not supported by a particular JavaScript™ engine, so the method may be implemented manually and used to fill a built-in prototype.

12) Single-SPA: It is a set of micro-frontend framework, which takes over browser address switching to achieve the purpose of switching applications, and also manages the life cycle of each application from startup to destruction. Additional functions (such as animation) may be added during the life cycle change process, and at the same time, Single-SPA also provides plugins for different SPA frameworks to integrate existing applications.

13) Micro-frontend; It includes a primary application and sub-applications, which divides an application program into a plurality of vertical slices, and each slice is built from an underlying database to an upper-layer user interface. The primary application is a framework, which mainly integrates login, menu and navigation, and provides global data and public methods. Specific functional modules are implemented in the sub-applications as much as possible. For example, functions of the primary application may include: login, menu and navigation; and functions of the sub-applications may correspond to specific web contents.

14) Webpack: It is used for analyzing a project structure to find JavaScript™ modules and extension languages that the browser cannot run directly, and converting and packing them into a suitable format for a browser to use. FIG. 10 is a schematic diagram of application layering provided according to an embodiment of the disclosure. An actual back management system is taken as an example for description. The back management system requires login authentication, and has a menu bar on the left and a personal information navigation bar above. The middle part shows a specific page content. Based on this characteristic, the back management system may be divided into two parts: a primary application (e.g., a login module+a menu module+a navigation module) and a sub-application (e.g., a specific content page module). The primary application is a main body framework, which mainly integrates a login module, a menu module, and a navigation module, and provides global data and public methods. The sub-application needs to consider additional independence. If it is in a micro-frontend environment, the sub-application is used as a part of a whole application. Therefore, the sub-application will be closely related to the primary application, but the sub-application itself is also relatively independent, namely the sub-application may also run independently of the primary application. The sub-application may be integrated to the primary application and run in a micro-frontend architecture, and may also be run independently of the primary application. For example, the primary application is a web page search application, and the sub-application is an advertisement recommendation application, a top search application, and the like.

In a micro-frontend solution of the related art technology, a routing service is forwarded by a Nginx service, which is inefficient. Central routing depends on the stability of the Nginx service, so that the disaster recovery solution is complex. The Nginx solution is highly dependent on Nginx service configurations. In case of modification of the configurations, the central routing Nginx service needs to be restarted, so that the maintenance cost is high. A single communication mechanism will make it difficult to manage post-events caused by multiple applications. Iframe is used as an application loader, lacking arranging and control ability for sub-applications. The micro-frontend solution of the related art technology does not consider the sub-application running ability under multiple frontend frameworks, does not consider the activation ability of the sub-application under multi-level routing, does not consider the active invocation and activation ability of the sub-application through the primary application, and does not provide a cross-domain solution for resources; the micro-frontend solution of related art technology deploys resources in a unified manner, but the problem of frontend cross-domain invocation of resources after distributed deployment of the resources, including, but not limited to: an interface request, a private static resource, a Content Delivery Network (CDN) static resource, a Web Worker resource, and the like.

An embodiment of the disclosure provides a micro-frontend system, which provides an application loader module configured to load frontend applications of different frameworks, such as the Vue framework, the React framework; and implements the JavaScript sandbox mechanism to ensure JavaScript™ environment isolation. The system further provides cross-domain processing of sub-application Web Worker, and implements CSS isolation by packing and injecting a CSS prefix in sub-applications, injecting a CSS prefix during running of sub-application, and loading sub-applications by Shadow Dom. The three parent and child application communication mechanisms including Props transmission, Custom Event and PostMessage are provided; a routing registration service is provided; a centralized routing discovery ability is provided; and running under original Iframe is supported.

An exemplary application of a micro-frontend system provided by an embodiment of the disclosure is described below. FIG. 1 is a schematic diagram of a composition structure of a micro-frontend system provided according to an embodiment of the disclosure. As shown in FIG. 1, the micro-frontend system 100 includes: a routing registration service 101, a command line tool 102 and a micro-frontend running framework 103. The routing registration service 101 is an independently maintained and run Node backend service, configured to provide routing information of a sub-application, a loading manner of the sub-application and deployment information of the sub-application for the micro-frontend running framework of a primary application. By providing the route registration service which is the independently maintained and run Node service, superior expansion and disaster recovery capabilities are provided to maintain registration and loading routing of sub-applications of a micro-frontend.

As an example, the route registration service may be a server that provides an HTTP service. In an actual implementation, this may be implemented by Node.js. A set of web-side server with functions of recording routing, deleting routing, inquiring routing and authorizing login is implemented through the Koa framework. A database uses a relational database management system (such as MySQL). The route registration service 101 may be a service that implements the same function by any server or language, such as JavaJava™ Spring Cloud, and C++ Server Kit.

Since the routing registration service is an independently maintained and run Node backend service, a load balancing service may also be placed in front of the routing registration service. After a network request is acquired, the network request may be allocated to a routing registration service with a low load based on loads of various routing registration service; and superior expansion and disaster recovery capabilities may be also provided if a plurality of routing registration services all have high loads.

The command line tool 102 is configured to provide a sub-application creation function, a sub-application access function and a service registration function through a command line.

As an example, a tool, namely the command line tool 102, for a user to interact with a command line may be provided through Inquirer.js. During implementation, the command line tool may be a command-line interface (CLI) tool, or may be an npm library or a Graphical User Interface (GUI) tool. Commands such as creating a sub-application and accessing a sub-application inputted by a user may be received through the command line tool 102, and service registration is performed based on the received commands.

The micro-frontend running framework 103 is a framework running in a primary application is configured to load and run, based on the acquired network request, the sub-application and may provide a multi-framework sub-application running ability.

As an example, the primary application is also an application that is arbitrarily accessed to the micro-frontend running framework. During implementation, the micro-frontend running framework may provide a multi-framework sub-application loading ability based on Single-SPA.

The micro-frontend system provided by an embodiment of the disclosure includes a routing registration service, a command line tool and a micro-frontend running framework. The routing registration service is an independently maintained and run Node backend service, so that superior expansion and disaster recovery capabilities may be provided; the routing registration service provides the routing information and loading manner of the sub-application and the deployment information of the sub-application for the micro-frontend running framework of the primary application. The command line tool is configured to provide a sub-application creation function, a sub-application access function and a service registration function through a command line. The micro-frontend running framework is a framework running in the primary application, is configured to load and run, based on an acquired network request, the sub-application and may provide a multi-framework sub-application running ability.

In some embodiments, as shown in FIG. 1, the micro-frontend system further includes: a frontend interface 104 corresponding to the routing registration service, sub-application registration information required to be set for sub-application registration being acquired through the frontend interface 104 and transmitted to the routing registration service.

The sub-application registration information includes: a sub-application framework, a sub-application routing mode and a sub-application loading mode. For example, the sub-application framework may include Vue, React, etc.; the sub-application routing mode may include a hash mode, a history mode, etc.; and the sub-application loading mode may include: a JavaScript™ loading mode, a CSS loading mode, an HTML loading mode, etc.

In some embodiments, the sub-application registration information may further include a service name, a sub-application local development environment address, a sub-application online environment address, and the like.

The routing registration service 101 is configured to receive the sub-application registration information and register, based on the sub-application registration information, the sub-application.

In some embodiments, the command line tool 102 is configured to receive a sub-application creation command and acquire the routing information and resource information of the sub-application and sub-application template information.

In this embodiment of the disclosure, the routing information of the sub-application may include: a sub-application resource address and a sub-application resource registration path; the sub-application resource information may include a sub-application resource name and a sub-application resource type; and the sub-application template information may include a template identifier.

The command line tool 102 generates, based on the sub-application template information, a sub-application template, and transmits a sub-application creation request to the routing registration service 101, the sub-application creation request carrying the routing information and the resource information. In some embodiments, the routing registration service 101 registers the sub-application based on the routing information and the resource information carried in the sub-application creation request after receiving the sub-application creation request.

In this embodiment of the disclosure, after the command line tool 102 sends the sub-application creation request to the routing registration service, the command line tool 102 sends a sub-application deployment request to a deployment server, and the deployment server performs resource deployment based on a sub-application resource address in the deployment request.

In some embodiments, the command line tool 102 is further configured to receive a sub-application access command, acquire the routing information and resource information of the sub-application, and send a sub-application access request to the routing registration service 101, the sub-application access request carrying the routing information and resource information of the sub-application.

The routing registration service 101 is further configured to receive the sub-application access request, and register, based on the routing information and resource information of the sub-application, the sub-application.

Figure 2:
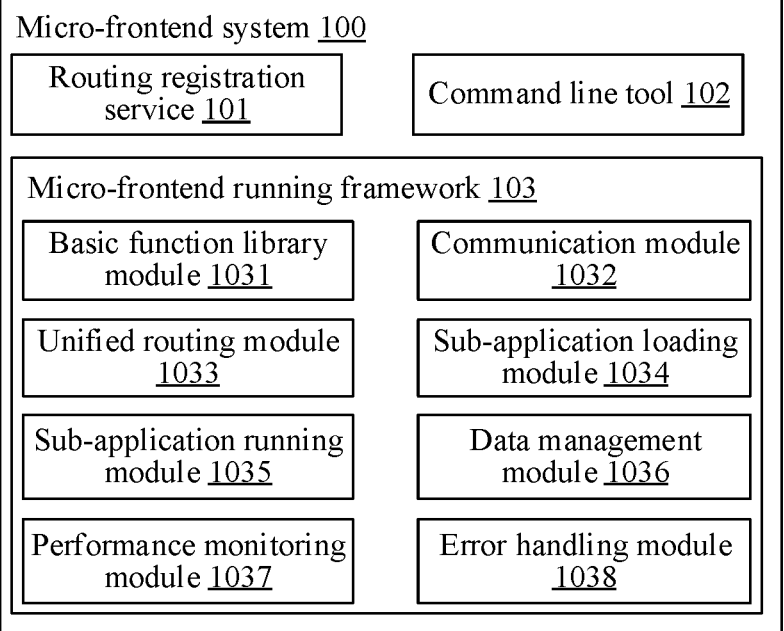
FIG. 2 is a schematic diagram of another composition structure a micro-frontend system provided according to an embodiment of the disclosure.

FIG. 2 is a schematic diagram of another composition structure a micro-frontend system provided according to an embodiment of the disclosure. In some embodiments, the composition structure of the micro-frontend running framework 103 shown in FIG. 1 may be as shown in FIG. 2 and includes: a basic function library module 1031, a communication module 1032, a unified routing module 1033, a sub-application loading module 1034 and a sub-application running module 1035.

The basic function library module 1031 is configured to provide a public method and a public component, and inject, by a global variable and a function, the public method and the public assembly (or the public component) into the sub-application for use by the sub-application.

In some embodiments, the basic function library module may also provide common Polyfilling for use by the sub-application.

The communication module 1032 is configured to support communication mechanisms from the primary application to the sub-application, from the sub-application to the sub-application and from the sub-application to the primary application.

In this embodiment of the disclosure, the communication mechanism from the primary application to the sub-application includes Props transmission and Custom Event transmission; the communication mechanism from the sub-application to the sub-application includes asynchronous PostMessage transmission of different source scripts; and the communication mechanism from the sub-application to the primary application includes Custom Event transmission. The Props transmission may provide a responsive two-way data transfer capability. The Custom Event may define distribution and registration of events based on components, avoiding the impact of unrelated events in case of too many applications. The PostMessage provides global event transmission and receiving, and is used for implementing broadcast message notification. In this embodiment of the disclosure, there are corresponding implementation schemes in each communication dimension, in which the measure is abundant and the side effects are small.

This embodiment of the disclosure provides three types of communication supports, including Props transmission, Custom Event transmission, and PostMessage transmission. The Props transmission may provide the responsive two-way data transfer capability. The Custom Event may define distribution and registration of events based on components, avoiding the impact of unrelated events in case of too many applications. The PostMessage provides global event transmission and receiving, and is used for implementing broadcast message notification. There are corresponding implementation schemes in each communication dimension, in which the measure is abundant and the side effects are small.

The unified routing module 1033 is configured to monitor browser routing changes.

During implementation, the unified routing module 1033 uses Single-SPA to monitor the browser routing changes and load, activate, and run sub-applications or primary application sub-paths under a specified framework. When the primary application is initialized, a sub-application registration path, resources and other information under the unified routing module 1033 are pulled from the routing registration service.

The sub-application loading module 1034 is configured to acquire and load a resource corresponding to the sub-application resource address based on a sub-application resource address acquired from the routing registration service.

As an example, when the sub-application loading module 1034 loads the resource corresponding to the sub-application resource address, the sub-application loading module will load the sub-application resource according to the sub-application loading mode in the sub-application registration information. The modes for loading a sub-application of the sub-application loading module at least include an HTML entity mode, a JavaScript™ entity mode and an Iframe mode. When the loading mode is the HTML entity mode, an HTML file is loaded. When the loading mode is the JavaScript™ entity mode, a JavaScript™ file is loaded. When the loading mode is the Iframe mode, a URL is directly embedded in the Iframe and opened.

In some embodiments, the sub-application loading module 1034 acquires, after acquiring the resource corresponding to the sub-application resource address, a business code of the sub-application based on the resource, parses the acquired business code of the sub-application, and transmits the parsed business code to the sub-application running module 1035.

The sub-application running module 1035 is configured to run the resource corresponding to the sub-application resource address to render a sub-application page.

The sub-application running module 1035 includes a runtime environment sandbox, the parsed business code obtained by the sub-application running module is executed in the runtime environment sandbox.

In an actual implementation, the runtime environment sandbox includes: a JavaScript™ sandbox, a CSS sandbox and a Web Worker sandbox. The basic JavaScript™ sandbox is achieved using a with sentence and a proxy. Basic security is achieved under controllable sub-applications, and action scope escape methods are overcome through stack checking and keyword checking. The proxy is an object collection accessible by the sub-application, and the JavaScript™ sandbox enables the business code of the sub-application to only access accessible objects in the proxy, but not objects of other sub-applications or the primary application. When the parsed business code is executed in the JavaScript™ sandbox, the parsed business code is put into the sandbox for execution by taking the proxy as a global root object, that is, the business code may only access the objects and attributes of the proxy, without affecting other variables of an outer layer, to achieve secure isolation.

Three CSS sandbox measures are provided in this embodiment of the disclosure: The first CSS sandbox measure is based on a sub-application webpack prefix. The sub-application webpack prefix is to allocate a separate namespace to styles of each sub-application, so as to avoid mutual impact of the styles affecting each other. The second CSS sandbox measure is based on a sub-application runtime prefix, which dynamically adds a prefix for styles of the sub-application during running of the sub-application to avoid conflicts of the styles. The third CSS sandbox measure is based on Shadow Dom. The CSS sandbox based on Shadow Dom may provide a browser-level style isolation capability and may achieve complete isolation.

The Web Worker sandbox is configured to perform inline running on a script file allocated to the Web Worker to achieve cross-domain invocation on the Web Worker.

The sub-application resource loading module hijacks file *.worker.js when loading the resource, loads the file back into a browser internal memory as a text content, and performs inline running on the script file (*.worker.js) of the Web Worker using the Web Worker sandbox, and the inline Web Worker script file will not cause cross-domain problems, thus solving the cross-domain problem of the Web Worker.

In some embodiments, the micro-frontend system further includes a server that supports cross-domain resource sharing. During implementation, the server automatically carries a Cross-origin Resource Sharing (CORS) header, which supports the cross-origin resource sharing, allowing a browser to access private static resources and CDN static resources across domains.

This embodiment of the disclosure provides a server-side CORS scheme including interface resources to support cross-domain; the CDN static resources provide a CORS scheme; and the Web Worker provides an inline building loader and an inline running loader to solve the problem of cross-domain invocation of worker. This embodiment of the disclosure further provides measures such as caching, preloading, and Web Worker to accelerate the loading and invocation of sub-applications.

In some embodiments, as shown in FIG. 2, the micro-frontend running framework 103 further includes: a data management module 1036, a performance monitoring module 1037, an error handling module 1038, wherein the data management module 1036 is configured to realize a two-way data binding function by data provided by a Props transmission mechanism, thus sharing data of parent and child applications.

In this embodiment of the disclosure, when the parent and child applications are loaded in the same runtime environment, the primary application will transmit an object with a monitoring function to the sub-application, and a change in the sub-application may be monitored by the object, so that sharing of the data of the parent and child applications may be achieved.

The performance monitoring module 1037 is configured to monitor a loading duration and a running duration of the sub-application.

During implementation, the primary application monitors information such as the loading duration and running duration of the sub-application through a preset function.

The error handling module 1038 is configured to monitor and handle error information of the sub-application in the loading and running processes.

During implementation, the primary application monitors and processes sub-application errors by registering window.addEventListener('error', errorHandler) and window.addEventListener('unhandledrejection', errorHandler), so that error information of the sub-application may be processed in time to ensure the reliability of the micro-frontend system.

Based on the micro-frontend system provided by the foregoing embodiments, this embodiment of the disclosure further provides a sub-application loading method based on a micro-frontend system which is configured as the micro-frontend system provided by the foregoing embodiments.

FIG. 3 is a schematic diagram of an implementation process of a sub-application loading method based on a micro-frontend system provided according to an embodiment of the disclosure. As shown in FIG. 3, the method includes S301-S305:

Step S301. A network access request is acquired.

As an example, the network access request carries a URL address. The network access request may be triggered by a network access operation of a user. The functional network access request may be a request configured to access a primary application, or may be a request to access a sub-application. When it is a network access request for accessing a sub-application, the network access request for the sub-application may be triggered, based on an icon of the sub-application provided in the primary application interface, after a user inputs a URL address of a primary application into a browser and the browser renders a primary application interface.

In this embodiment of the disclosure, before step S301, the micro-frontend system has completed the deployment of the primary application and the deployment of a routing registration service, and has completed the creation and registration of the sub-application through a CLI tool.

Step S302. Corresponding routing information is pulled from the routing registration service of the micro-frontend system based on the URL address.

As an example, during implementation of step S302, the URL address may be sent to the routing registration service, and the routing registration service determines an application identifier to be accessed according to the URL address, and then pulls, based on the application identifier, the corresponding routing information.

Step S303. The sub-application loading module of the micro-frontend system acquires, based on the routing information, a sub-application resource corresponding to the routing information from the routing registration service in a case that it is determined, based on the routing information, that a page to be accessed is a sub-application page.

As an example, after the routing information corresponding to the application is acquired, if it is determined that the page to be accessed is the sub-application page, the routing registration service may acquire the corresponding sub-application resource according to the routing information, such as CSS, JavaScript™ and other static resource document.

Step S304. The sub-application loading module loads the sub-application resource in a case that the sub-application resource needs to be loaded.

In this embodiment of the disclosure, after acquiring the sub-application resource, the sub-application loading module first determines whether the sub-application resource needs to be loaded and then loads, based on a loading mode of the sub-application when the sub-application resource needs to be loaded, the sub-application resource; and it indicates that the sub-application resource has been loaded when it is determined that the sub-application resource does not need to be loaded. At this time, the sub-application resource is directly run to render the sub-application page.

Step S305. The sub-application running module of the micro-frontend system runs the sub-application resource to render the sub-application page.

In some embodiments, the sub-application loading module acquires, after acquiring the sub-application resource, a business code of the sub-application based on the sub-application resource, parses the acquired business code of the sub-application, and transmits the parsed business code to the sub-application running module. The sub-application running module executes, after obtaining the parsed business code, the parsed business code in an own runtime environment sandbox, so as to render the sub-application page.

In an actual implementation, the runtime environment sandbox includes: a JavaScript™ sandbox, a CSS sandbox and a Web Worker sandbox. The basic JavaScript™ sandbox is achieved using a with sentence and a proxy. Basic security is achieved under controllable sub-applications, and action scope escape methods are overcome through stack checking and keyword checking. The proxy is an object collection accessible by the sub-application, and the JavaScript™ sandbox enables the business code of the sub-application to only access accessible objects in the proxy, but not objects of other sub-applications or the primary application. When the parsed business code is executed in the JavaScript™ sandbox, the parsed business code is put into the sandbox for execution by taking the proxy as a global root object, that is, the business code may only access the objects and attributes of the proxy, without affecting other variables of an outer layer, to achieve secure isolation.

Three CSS sandbox measures are provided in this embodiment of the disclosure: The first CSS sandbox measure is based on a sub-application webpack prefix. The sub-application webpack prefix is to allocate a separate namespace to styles of each sub-application, so as to avoid mutual impact of the styles affecting each other. The second CSS sandbox measure is based on a sub-application runtime prefix, which dynamically unloads application styles during running of the sub-application to avoid conflicts of the styles. The third CSS sandbox measure is based on Shadow Dom. The CSS sandbox based on Shadow Dom may provide a browser-level style isolation capability and may achieve complete isolation.

The Web Worker sandbox is configured to perform inline running on a script file allocated to the Web Worker to achieve cross-domain invocation on the Web Worker. The sub-application resource loading module hijacks file *.worker.js when loading the resource, loads the file back into a browser internal memory as a text content, and performs inline running on the script file (*.worker.js) of the Web Worker using the Web Worker sandbox, and the inline Web Worker script file will not cause cross-domain problems, thus solving the cross-domain problem of the Web Worker.

In the sub-application loading method based on the micro-frontend system provided according to this embodiment of the disclosure, after the network access request is acquired, the corresponding routing information is pulled from the routing registration service of the micro-frontend system based on the URL address carried in the network access request; when it is determined, based on the routing information, that the page to be accessed is the sub-application page, the sub-application loading module of the micro-frontend system acquires the sub-application resource corresponding to the routing information from the routing registration service based on the routing information; and when the sub-application resource needs to be loaded, the sub-application loading module loads the sub-application resource, and the sub-application running module of the micro-frontend system run the sub-application resource to render the sub-application page.

FIG. 4 is a schematic diagram of another implementation process of a sub-application loading method based on a micro-frontend system provided according to an embodiment of the disclosure. In some embodiments, as shown in FIG. 4, before step S304, the sub-application loading method based on the micro-frontend system further includes:

Step S003. Whether the sub-application resource is preloaded or opened is determined.

As an example, when the sub-application resource is not preloaded and not opened, it is determined that the sub-application resource needs to be loaded, and step S304 is executed at this time. When the sub-application resource has been preloaded or has been opened, it is determined that the sub-application resource does not need to be loaded again, and step S305 is executed at this time. This may speed up the loading and invocation of sub-applications.

In some embodiments, before the sub-application is loaded, the sub-application needs to be registered and deployed first, and the sub-application registration process may be implemented through the following steps:

Step S001. Sub-application registration information required to be set for registration of the sub-application is acquired and is then transmitted to the routing registration service.

As an example, the sub-application registration information at least includes: a sub-application framework, a sub-application routing mode and a sub-application loading mode.

The micro-frontend system may include a frontend interface corresponding to the routing registration service, and may also include command line tool configured to create sub-applications and access the sub-applications. Correspondingly, there are two implementations for step S001:

I. An inputting operation for sub-application registration is acquired by the frontend interface corresponding to the routing registration service, and the sub-application registration information is determined based on the inputting operation.

During the acquisition of the sub-application registration information based on the first manner, the frontend interface is first presented based on an operation instruction for opening the frontend interface, and then the inputting operation for the sub-application registration is received through the frontend interface. As a parameter required to be set for inputting the sub-application registration, the inputting operation may include, for example: a service name, a sub-application framework, a sub-application local development environment address, a sub-application online environment address, a sub-application registration sub-routing, a sub-application routing mode (hash or history), and a sub-application loading mode.

In some embodiments, the frontend interface further provides a graphic control for determining registration. After the user determines the completion of the setting of the sub-application registration information, the user may click or touch-control the graphic control to send the sub-application registration information to the routing registration service. When the sub-application registration information is sent to the routing registration service, an HTTP request for sub-application registration may be sent to the routing registration service. The HTTP request may carry the sub-application registration information.

II. A sub-application creation command is received through a command line tool; an inputting operation for sub-application creation is acquired; and the sub-application registration information is determined based on the inputting operation.

Similar to the first implementation manner, the second implementation is as follows: When the sub-application registration information is acquired based on the command line tool, the command line tool needs to be initiated first, and then the command line tool is used to receive the sub-application creation command and then acquire the inputting operation for the sub-application creation. The inputting operation is used as the parameter required to be set for inputting the sub-application registration, so that the sub-application registration information is acquired according to the inputting operation, and may include, for example, a sub-application resource name, a sub-application resource address, a sub-application resource type, and a sub-application resource registration path. During implementation, a sub-application template identifier is selected through the command line tool, and then a corresponding template is automatically generated by the command line tool; and the sub-application resource address, the sub-application resource registration address and other information are injected. When the sub-application registration information is sent to the routing registration service, the sub-application registration information is sent to the routing registration service based on the information sending command by inputting an information sending command.

Step S002, the routing registration service receives the sub-application registration information, and registers, based on the sub-application registration information, the sub-application.

Through the above steps S001 to S002, the micro-frontend system may register the routing information and resource information of the sub-application by itself, thereby improving the flexibility of registering sub-applications.

In some embodiments, step S304 shown in FIG. 3 "Load, by the sub-application loading module, the sub-application resource in a case that the sub-application resource needs to be loaded" may be implemented by the following steps:

Step S3041. A framework identifier and a resource loading mode of the sub-application are acquired in a case that the sub-application resource needs to be loaded.

As an example, the framework identifier of the sub-application may include Vue, React and the like, and the resource loading mode may include: a JavaScript™ entity loading mode, a CSS entity loading mode, an Iframe loading mode, and the like.

Step S3042. The sub-application resource is loaded in a sub-application framework corresponding to the framework identifier according to the resource loading type.

As an example, when the loading mode is the HTML entity mode, an HTML file is loaded. When the loading mode is the JavaScript™ entity mode, a JavaScript™ file is loaded. When the loading mode is the Iframe mode, a URL is directly embedded in the Iframe and opened.

Figure 5:
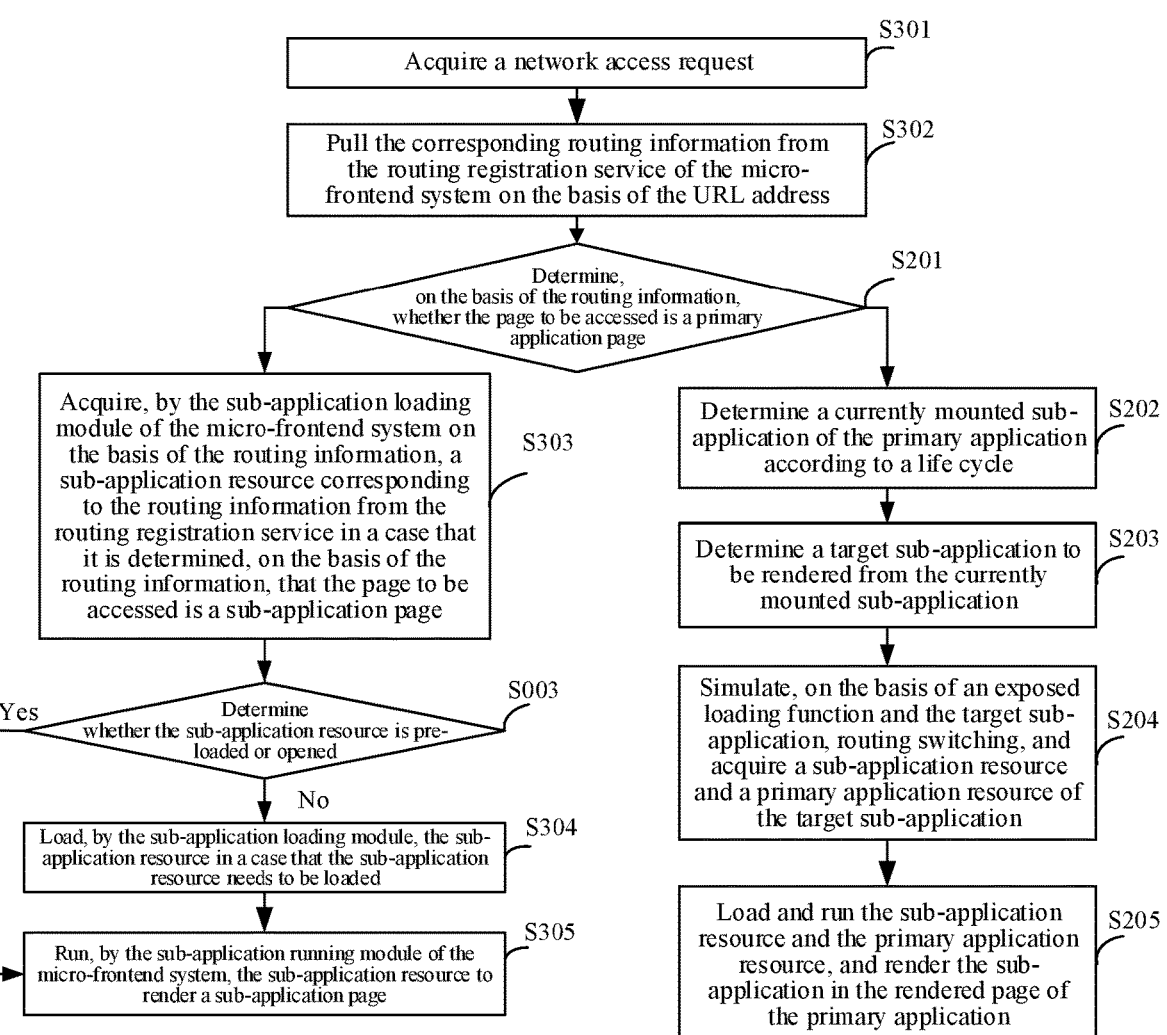
FIG. 5 is a schematic diagram of an implementation process of a sub-application loading method based on a micro-frontend system provided according to an embodiment of the disclosure.

FIG. 5 is a schematic diagram of an implementation process of a sub-application loading method based on a micro-frontend system provided according to an embodiment of the disclosure. In some embodiments, as shown in FIG. 5, after step S302, the method further includes the following steps S201-S205:

Step S201. Whether a page to be accessed is a primary application page is determined based on the routing information.

As an example, step S202 is executed when it is determined, based on the routing information, that the page to be accessed is the primary application page; and step S303 is executed when it is determined, based on the routing information, that the page to be accessed is a sub-application page.

Step S202. A currently mounted sub-application of a primary application is determined according to a life cycle.

Step S203. A target sub-application to be rendered is determined from the currently mounted sub-application.

As an example, step S203 may be: At least one target sub-application to be rendered is determined from the currently mounted sub-application according to a preset rule, for example, one or more currently mounted sub-applications that are accessed most frequently are selected and determined as target sub-applications.

Step S204, routing switching is simulated based on an exposed loading function and the target sub-application, and a sub-application resource and a primary application resource of the target sub-application are acquired.

As an example, when the page to be accessed is the primary application page, the primary application resource is first acquired according to the routing information. In the disclosure, since the loading function is exposed, the loading function may be actively invoked by the primary application. When the primary application actively invokes the exposed loading function, the route switching may be simulated, thereby triggering the sub-application loading module of the micro-frontend system to acquire the sub-application resource of the target sub-application.

Step S205. The primary application resource and the sub-application resource are loaded and run, so as to render the sub-application in the rendered page of the primary application.

During implementation of the step S205, the primary application resource is first loaded and run to render a primary application interface, and the sub-application resource is then run to also render a sub-application page, so that the primary application may actively render the sub-application, without relying on the route registration.

In the embodiment with steps S201 to S205, when the page to be accessed is the primary application page, the currently mounted sub-application may be determined according to the life cycle of the primary application, and the target sub-application may be determined based on the preset principle. Furthermore, by invoking the exposed loading function, the route switching is simulated, and the sub-application resource of the target sub-application is acquired; and the sub-application page is displayed in the rendered page of the primary application, so as to achieve active rendering of the sub-application by the primary application.

The following describes an exemplary application of this embodiment of the disclosure in an actual application scenario.

FIG. 6 is a schematic diagram of a micro-frontend system provided by an embodiment of the disclosure. As shown in FIG. 6, the micro-frontend system includes: a routing registration service 601, a frontend page corresponding to the routing registration service, a sub-application access and generation CLI tool 602, and a micro-frontend running framework 603 of a primary application.

The routing registration service 601 provides routing information of a sub-application, loading manner, and deployment information of the sub-application for the micro-frontend running framework 603.

During implementation, one frontend interface may be provided for sub-application routing registration, through which parameters required for routing registration may be set. The parameters that need to be set include but are not limited to: a service name, a sub-application framework, a sub-application local development environment address, a sub-application online environment address, a sub-application registration sub-routing, a sub-application routing mode (hash or history), and a sub-application loading mode.

The route registration service 601 may be a server that provides an HTTP service, mainly implemented by Node.js. A set of webpage server with functions of recording routing, deleting routing, inquiring routing and authorizing login is implemented through the Koa framework. A database uses MySQL or databases of other forms.

During implementation, the route registration service may be a Node backend service, through which the registration information of the sub-application is received. An application loader parses and discovers the sub-application through the Node backend service, and determines, through the information, how to load the sub-application. Multiple Node single services are started through PM2. The PM2 is a Node application process manager with a load balancing function. In addition, the routing registration service may also include a load balancing service, configured to provide disaster recovery and expansion capabilities of services.

The CLI tool 602 provides functions including a sub-application creation function, a sub-application access function, a service registration and deployment function, and the like.

During implementation, a set of command line tool is provided through Inquirer.js, which provides functions of sub-application creation, sub-application accessing, and service registration and deployment.

During implementation of sub-application creation, a user may first enter a sub-application creation command at a command line, fill in the sub-application resource name, the sub-application resource address, the sub-application resource type, and the sub-application resource registration path, and select a sub-application template. The CLI tool automatically generates the corresponding template, injects the routing information, and automatically registers resource information to the routing registration service.

During implementation of the sub-application, the user may enter a sub-application access command at the command line, and fill in the sub-application resource name, the sub-application resource address, the sub-application resource type, and the sub-application resource registration path. The CLI tool automatically searches a sub-application entry file, and adds a life cycle function required by the primary application. The CLI tool automatically registers the resource information to the route registration service.

During implementation of the service registration function, the CLI tool carries the sub-application creation command, fills in the sub-application resource name, the sub-application resource address, the sub-application resource type, the sub-application resource registration path and other parameters, and sends them to the routing registration service through an HTTP request.

During implementation of the deployment function, the CLI tool sends a deployment request to the route registration service through the HTTP request.

The micro-frontend running framework 603 is a framework running on the primary application. The primary application may also be referred to as a parent application or an APP shell. The APP shell includes a public resource library, an application loader, a resource loader (Single-SPA pack), and a runtime environment sandbox. The runtime environment sandbox includes a JavaScript™ sandbox, a Web Worker inline sandbox and a CSS environment isolation sandbox. The APP shell also supports running in the Iframe mode.

The primary application is any application that accesses the micro-frontend running framework.

As shown by 603 in FIG. 6, the micro-frontend running framework includes a basic function library, a communication module, a data management module, a performance monitoring module, an error handling module, a unified routing module, a sub-application loading module, and a sub-application running module.

The basic function library provides common polyfills, public methods and components, which are injected to sub-applications through global variables and functions for use by the sub-applications.

The communication module provides event communication through Custom Event, provides message communication through PostMessage, and provides system data communication through Props transmission in the life cycle.

FIG. 7 is a schematic diagram of a communication mechanism in a micro-frontend system provided according to an embodiment of the disclosure. As shown in FIG. 7, a communication manner from a primary application to a sub-application may include: two communication mechanisms, Props and Custom Event. A communication manner from a sub-application and a primary application may include: two communication mechanisms, Custom Event (component) and Custom Event (window). A communication manner from a sub-application to a sub-application includes: two communication manners, PostMessage and BroadcastChannel.

The data management module may realize, through data provided by Props, a two-way data binding function to share data of parent and child applications.

The performance monitoring module is configured to monitor, by the primary application, loading time, running time and other data of the sub-application through a function of the primary application.

The error handling module is configured to monitor and handle error information of the sub-application in the loading and running processes.

As an example, the primary application monitors and handles, by a registered monitor, errors reported by the sub-application, wherein the registered monitor includes window.addEventListener('error', errorHandler) and window.addEventListener('unhandledrejection', errorHandler).

The unified routing module uses Single-SPA to monitor the browser routing changes and load, activate, and run sub-applications or primary application sub-paths under a specified framework. When the primary application is initialized, a sub-application registration path, resources and other information under the unified routing module are pulled from the routing registration service.

The sub-application loading module is configured to load sub-application resources.

Figure 8:
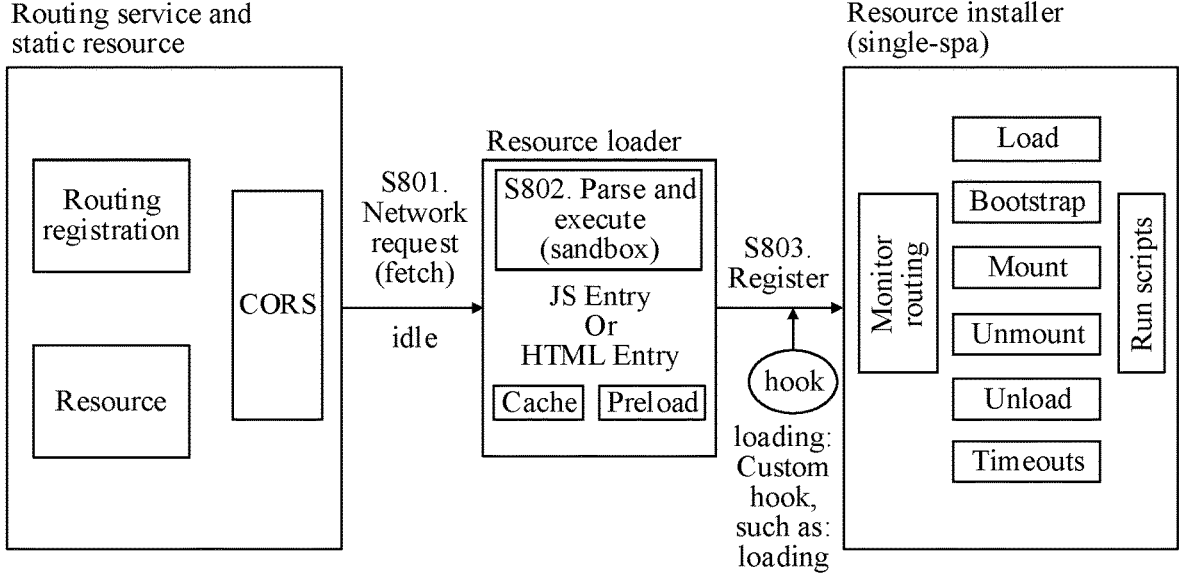
FIG. 8 is a schematic diagram of an implementation process of loading a sub-application resource by a sub-application loading module provided according to an embodiment of the disclosure.

FIG. 8 is a schematic diagram of an implementation process of loading a sub-application resource by a sub-application loading module provided according to an embodiment of the disclosure. As shown in FIG. 8, the process includes:

Step S801. Routing and static resources are pulled from a route registration service based on an acquired network request.

As an example, the network request carries a URL address. During implementation of step S801, an application identifier corresponding to the URL address may be determined from the route registration service based on the URL address, and the route registration service may then determine, according to the application identifier, corresponding routing information, and acquire, based on the routing information, a static resource.

Step S802. A resource loader loads a sub-application resource.

The resource loader may load sub-applications of different frameworks, and may load HTML Entry, JavaScript™ Entry and Iframe. The HTML mode loads a static file through a reference resource in HTML; the JavaScript™ is mode loads a resource dynamically through JavaScript™; and the traditional Iframe mode is also provided to load sub-applications.

In this embodiment of the disclosure, in consideration of the performance and the cross-domain impact, the resource loader may further provide preloading, caching, idle loading, and other measures.

Step S803. Resource information registration is performed after the resource loader loads the sub-application resource.

As an example, the loaded sub-application resource information is registered in an internal memory after the resource loader loads the sub-application resource.

The sub-application loading module includes a resource loader and a resource installer. The resource installer is based on Single-SPA encapsulation, which may provide a sub-application running ability under multiple frontend frameworks. The Single-SPA provides a function of route monitoring. When routing switching is applied, a framework code and a business code of the corresponding sub-application will be loaded according to the life cycle, so as to realize the ability to run different frameworks and activate multilevel routing. Furthermore, the route switching is simulated by an exposed loading function, so that the primary application actively invokes the activation ability.

The sub-application running module includes a JavaScript™ sandbox and a CSS sandbox (a non-traditional Iframe mode exists), and the sub-application running module is responsible for loading the JavaScript™ Mis resources pulled by the sub-application loading module.

Figure 9:
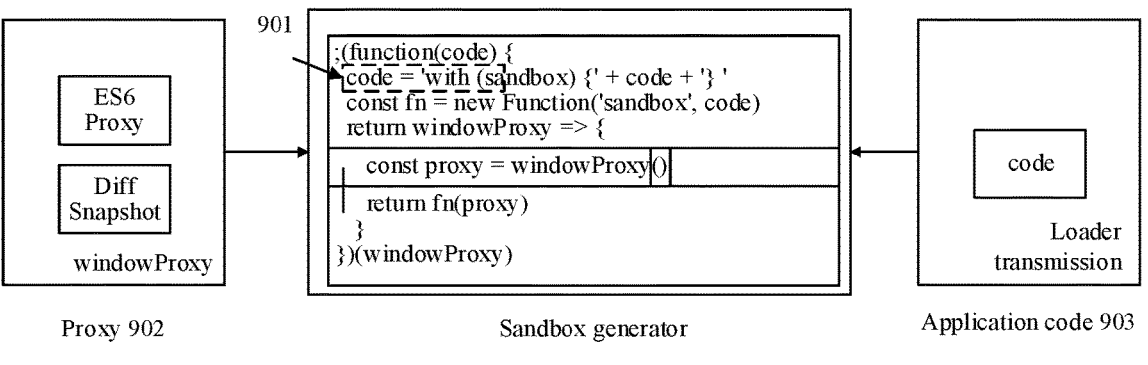
FIG. 9 is a schematic design diagram of a JavaScript™ sandbox provided according to an embodiment of the disclosure.

The design of the JavaScript™ sandbox is shown in FIG. 9. A with function 901 and a proxy 902 are used to implement the basic JavaScript Mis sandbox. In this embodiment of the disclosure, Proxy and snapshot proxy modes may be implemented, and the snapshot proxy mode is compatible with an environment that does not support ES6 Proxy. As shown in FIG. 9, an actual sub-application code 903 parsed by the resource loader of the application loader is put into the proxy sandbox for execution. Furthermore, common action scope escape methods are prevented by stack checking and keyword checking, so as to achieve basic security under controllable sub-applications.

In this Embodiment of the Disclosure, the Following Three CSS Sandbox Measures are Provided:

The first measure is based on a sub-application webpack prefix. Sub-applications need to be uniformly accessed to a packing tool, and a separate namespace is allocated to the styles of each sub-application.

The second measure is based on a sub-application runtime prefix.

It is difficult to support some styles, such as @keyframes, @font-face, and @import, and dynamically loaded <link> styles require special handling, so prefixes may be added to the styles of sub-applications during running of the sub-applications.

The third measure is based on Shadow Dom. Shadow Dom needs to deal with shadow boundaries, event loss, access control (shadowRoot) and other issues.

The micro-frontend system provided by an example embodiment of the disclosure provides a routing registration service, which, as an independently maintained and run Node service, provides good expansion and disaster recovery capabilities and maintains registration and loading routing of sub-applications of the micro-frontend. Furthermore, the multi-framework sub-application running ability is provided based on Single-SPA. A primary application is provided, based on a customized loading scheme, with an ability to actively render sub-applications, without relying on routing registration. In addition, three types of communication supports are provided for communication mechanisms, including Props transmission, Custom Event transmission, and PostMessage transmission. The Props transmission may provide the responsive two-way data transfer capability. The Custom Event may define distribution and registration of events based on components, avoiding the impact of unrelated events in case of too many applications. The PostMessage provides global event transmission and receiving, and is used for implementing broadcast message notification. There are corresponding implementation schemes in each communication dimension, in which the measure is abundant and the side effects are small. The micro-frontend system provides a server-side CORS scheme including interface resources to support cross-domain; the private static resources and the CDN static resources provide a CORS scheme to support the cross-domain; and the Web Worker provides an inline building loader and an inline running loader to solve the problem of cross-domain invocation of worker. Caching, preloading, Web Worker and other measures are also provided to speed up the loading and invocation of sub-applications. Furthermore, a scheme of loading sub-applications at runtime is provided, which may change sub-application rendering contents and interaction logics at runtime, so as to provide higher degree of freedom.

An embodiment of the disclosure provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the sub-application loading method based on a micro-frontend system according to this embodiment of the disclosure.

An embodiment of the disclosure provides a storage medium storing executable instructions, the executable instructions, when executed by a processor, causing the processor to perform the sub-application loading method provided in this embodiment of the disclosure; for example, the sub-application loading method shown in FIG. 3, FIG. 4, or FIG. 5.

In some embodiments, the storage medium may be a computer-readable storage medium, for example, a ferromagnetic random access memory (FRAM), a read-only memory (ROM), a programmable ROM (PROM), an erasable PROM (EPROM), an electrically EPROM (EEPROM), a flash memory, a magnetic surface memory, a compact disc, or a compact disk ROM (CD-ROM); or may be various devices including one or any combination of the foregoing memories.

In some embodiments, the computer-executable instructions may be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

Example Embodiments of the Disclosure Provide the Following Technical Benefits:

The micro-frontend system provided by an embodiment of the disclosure includes a routing registration service, a command line tool and a micro-frontend running framework. Superior expansion and disaster recovery capabilities may be provided through the independently maintained and run Node backend service; the routing registration service provides the routing information and loading manner of the sub-application and the deployment information of the sub-application for the micro-frontend running framework of the primary application. The command line tool provides functions of sub-application creation, sub-application accessing and service registration. The multi-framework sub-application running ability is provided.

In an example, the executable instructions may, but do not necessarily, correspond to a file in a file system, and may be stored in a part of a file that saves another program or other data, for example, be stored in one or more scripts in a Hyper Text Markup Language (HTML) file, stored in a file that is specially used for a program in discussion, or stored in a plurality of collaborative files (for example, be stored in files of one or more modules, subprograms, or code parts). In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A micro-frontend system, comprising at least one memory and at least one processor, the at least one memory storing a computer program, and the at least one processor being configured to execute the computer program to implement:

a routing registration service, a command line tool, and a micro-frontend running framework, wherein the routing registration service is configured to provide routing information of a sub-application, a loading manner of the sub-application, and deployment information of the sub-application for the micro-frontend running framework of a primary application, the routing registration service being a Node backend service, that is maintained and run independently of the primary application;

the command line tool is configured to provide a sub-application creation function, a sub-application access function, and a service registration function through a command line; and the micro-frontend running framework is a framework running in the primary application and is configured to load and run, based on a network request, the sub-application and provide a multi-framework sub-application running ability.

2. The micro-frontend system according to claim 1, the micro-frontend system further comprising:

a frontend interface, corresponding to the routing registration service and configured to acquire sub-application registration information and transmit the sub-application registration information to the routing registration service, the sub-application registration information comprising: a sub-application framework, a sub-application routing mode and a sub-application loading mode;

the routing registration service being further configured to receive the sub-application registration information and register, based on the sub-application registration information, the sub-application.

3. The micro-frontend system according to claim 1, wherein the command line tool is further configured to receive a sub-application creation command and acquire the routing information of the sub-application, resource information of the sub-application, and sub-application template information;

the command line tool is further configured to generate, based on the sub-application template information, a sub-application template, and transmit a sub-application creation request to the routing registration service, the sub-application creation request carrying the routing information and the resource information; and the command line tool is further configured to transmit, to a deployment server, a sub-application deployment request including a sub-application resource address, upon which resource deployment is performed.

4. The micro-frontend system according to claim 2, wherein the command line tool is further configured to receive a sub-application access command and acquire the routing information of the sub-application and resource information of the sub-application;

the command line tool is further configured to transmit a sub-application access request to the routing registration service, the sub-application access request carrying the routing information and the resource information of the sub-application;

the routing registration service is further configured to receive the sub-application access request and register, based on the routing information and the resource information of the sub-application, the sub-application.

5. The micro-frontend system according to claim 1, wherein the micro-frontend running framework comprises: a basic function library module, a communication module, a unified routing module, a sub-application loading module, and a sub-application running module, wherein the basic function library module is configured to provide a public method and a public component, and inject, by a global variable and a function, the public method and the public component into the sub-application for use by the sub-application;

the communication module is configured to support a communication mechanism from the primary application to the sub-application, a communication mechanism from the sub-application to the sub-application, and a communication mechanism from the sub-application to the primary application;

the unified routing module is configured to monitor a browser routing change;

the sub-application loading module is configured to acquire a sub-application resource address from the routing registration service and load a resource corresponding to the sub-application resource address; and the sub-application running module is configured to run the resource corresponding to the sub-application resource address and render a sub-application page.

6. The micro-frontend system according to claim 5, wherein the communication mechanism from the primary application to the sub-application comprises Props transmission and Custom Event transmission; the communication mechanism from the sub-application to the sub-application comprises PostMessage transmission; the communication mechanism from the sub-application to the primary application comprises the Custom Event transmission; and the sub-application loading module comprises modes for loading the sub-application, the modes comprising: a HyperText Markup Language (HTML) entity mode, a JS an entity mode, and an Iframe mode.

7. The micro-frontend system according to claim 5, wherein the micro-frontend running framework further comprises: a data management module, a performance monitoring module, an error handling module, wherein the data management module is configured to provide a two-way data binding function by using data provided by a Props transmission mechanism;

the performance monitoring module is configured to monitor a loading duration and a running duration of the sub-application; and the error handling module is configured to monitor and handle error information of the sub-application in the loading and running process.

8. The micro-frontend system according to claim 5, wherein the sub-application loading module is further configured to parse a service code of the sub-application, and transmit the parsed service code to the sub-application running module; and the sub-application running module comprises a runtime environment sandbox, in which the parsed service code runs.

9. The micro-frontend system according to claim 8, wherein the runtime environment sandbox comprises: a JS-sandbox, a cascading style sheet (CSS) sandbox, and a Web Worker sandbox.

10. The micro-frontend system according to claim 9, wherein the Web Worker sandbox is configured to perform inline running on a script file allocated to a Web Worker and execute cross-domain invocation on the Web Worker.

11. The micro-frontend system according to claim 1, wherein the micro-frontend system further comprises a server that supports cross-domain resource sharing.

12. A sub-application loading method, the method being executed by an electronic device that is configured as a micro-frontend system comprising at least one memory and at least one processor, the at least one memory storing a computer program, and the at least one processor being configured to execute the computer program to implement: a routing registration service, a sub-application loading module and a sub-application running module; the method comprising:

acquiring a network access request, the network access request carrying a uniform resource locator (URL) address of a page to be accessed;

pulling corresponding routing information from the routing registration service based on the URL address;

acquiring, by the sub-application loading module based on the routing information, a sub-application resource corresponding to the routing information from the routing registration service based on a determination that, based on the routing information, the page to be accessed is a page of a sub-application;

loading, by the sub-application loading module, the sub-application resource; and running, by the sub-application running module, the sub-application resource, and rendering the page of the sub-application, wherein the routing registration service is configured to provide routing information of a sub-application, a loading manner of the sub-application, and deployment information of the sub-application for the micro-frontend running framework of a primary application, the routing registration service being a Node backend service, that is maintained and run independently of the primary application;

the command line tool is configured to provide a sub-application creation function, a sub-application access function, and a service registration function through a command line; and the micro-frontend running framework is a framework running in the primary application and is configured to load and run, based on a network request, the sub-application and provide a multi-framework sub-application running ability.

13. The method according to claim 12, wherein the loading comprises:

loading the sub-application resource based on a determination that the sub-application resource is not pre-loaded and not opened.

14. The method according to claim 12, further comprising:

acquiring sub-application registration information, and transmitting the sub-application registration information to the routing registration service, the sub-application registration information comprising: a sub-application framework, a sub-application routing mode, and a sub-application loading mode; and receiving, by the routing registration service, the sub-application registration information, and registering, based on the sub-application registration information, the sub-application.

15. The method according to claim 14, wherein the acquiring the sub-application registration information comprises:

acquiring an inputting operation for sub-application registration, by a frontend interface corresponding to the routing registration service, or by a command line tool, which receives a sub-application creation command and acquires the routing information of the sub-application, resource information of the sub-application, and sub-application template information; and determining the sub-application registration information based on the inputting operation.

16. The method according to claim 12, wherein the loading the sub-application resource comprises:

acquiring a framework identifier and a resource loading type of the sub-application; and loading, according to the resource loading type, the sub-application resource in a sub-application framework corresponding to the framework identifier.

17. The method according to claim 12, further comprising:

based on a determination that, based on the routing information, the page to be accessed is a page of a primary application, determining a currently mounted sub-application of the primary application according to a life cycle;

determining a target sub-application to be rendered from the currently mounted sub-application;

simulating, based on an exposed loading function and the target sub-application, routing switching, and acquiring a sub-application resource and a primary application resource of the target sub-application; and loading and running the sub-application resource and the primary application resource, and rendering the sub-application in a rendered page of the primary application.

18. A non-transitory computer readable storage medium, storing executable instructions, the executable instructions, when executed by a processor, implementing a sub-application loading method and included in a micro-frontend system, the micro-frontend system comprising: a routing registration service, a sub-application loading module and a sub-application running module, the method comprising: = acquiring a network access request, the network access request carrying a uniform resource locator (URL) address of a page to be accessed;

pulling corresponding routing information from the routing registration service based on the URL address;

acquiring, by the sub-application loading module based on the routing information, a sub-application resource corresponding to the routing information from the routing registration service based on a determination that, based on the routing information, the page to be accessed is a page of a sub-application;

loading, by the sub-application loading module, the sub-application resource; and running, by the sub-application running module, the sub-application resource, and rendering the page of the sub-application, wherein the routing registration service is configured to provide routing information of a sub-application, a loading manner of the sub-application, and deployment information of the sub-application for the micro-frontend running framework of a primary application, the routing registration service being a Node backend service, that is maintained and run independently of the primary application;

the command line tool is configured to provide a sub-application creation function, a sub-application access function, and a service registration function through a command line; and the micro-frontend running framework is a framework running in the primary application and is configured to load and run, based on a network request, the sub-application and provide a multi-framework sub-application running ability.

19. The computer readable storage medium according to claim 18, wherein the method further comprises:

acquiring sub-application registration information, and transmitting the sub-application registration information to the routing registration service, the sub-application registration information comprising: a sub-application framework, a sub-application routing mode, and a sub-application loading mode; and receiving, by the routing registration service, the sub-application registration information, and registering, based on the sub-application registration information, the sub-application.

* * * * *